United States Patent [19]

Hashimoto

[11] Patent Number: 5,717,200

[45] Date of Patent: Feb. 10, 1998

[54] IMAGE READER

[75] Inventor: Yoshiyuki Hashimoto, Toyokawa, Japan

[73] Assignee: Minolta Co., Ltd., Osaka, Japan

[21] Appl. No.: 706,489

[22] Filed: Sep. 4, 1996

[30] Foreign Application Priority Data

Sep. 7, 1995 [JP] Japan .................................. 7-230237

[51] Int. Cl.⁶ .......................................................... H04N 3/14

[52] U.S. Cl. ...................... 250/208.1; 235/454; 235/455; 235/467; 235/472

[58] Field of Search ........................ 250/208.1; 235/454, 235/455, 467, 472

[56] References Cited

U.S. PATENT DOCUMENTS 4,794,427 12/1988 Shirai et al. .
5,084,611 1/1992 Okisu et al. .
5,517,018 5/1996 Zhang et al. .......................... 250/208.1

*Primary Examiner*—Harold Pitts
*Attorney, Agent, or Firm*—Burns, Doane, Swecker & Mathis, LLP

[57] ABSTRACT

A projector projects an image. A scanning mirror deflects the projected image by mirror oscillation method. A reading device reads the projected image deflected by said scanning mirror and outputs an image data corresponding to the projected image. A discriminating device discriminates which projection lens is mounted on said projection lens mount among said plurality of lenses. A memory device stores respective distortion data of said plurality of projection lenses and distortion data concerned with a distortion being due to the oscillation method. A correcting device corrects distortion of the distortion data of the projection lens which is discriminated to be mounted on the projection lens mount and the distortion data concerned with a distortion being due to the oscillation method.

18 Claims, 18 Drawing Sheets

FIG. 4

| DATA 0 | Distortion ratio due to mirror oscillation |
| --- | --- |
| DATA 1 | Distortion ratio of simple forcusing lens of 7.5x |
| DATA 2 | Distortion ratio of zoom lens of 9x to 16x (9x) |
| DATA 3 | Distortion ratio of zoom lens of 9x to 16x (10x) |
| DATA 4 | Distortion ratio of zoom lens of 9x to 16x (11x) |
| → | → |
| DATA 9 | Distortion ratio of zoom lens of 9x to 16x (16x) |
| DATA 10 | Distortion ratio of zoom lens of 13x to 27x (13x) |
| DATA 11 | Distortion ratio of zoom lens of 13x to 27x (14x) |
| → | |
| DATA 24 | Distortion ratio of zoom lens of 13x to 27x (27x) |

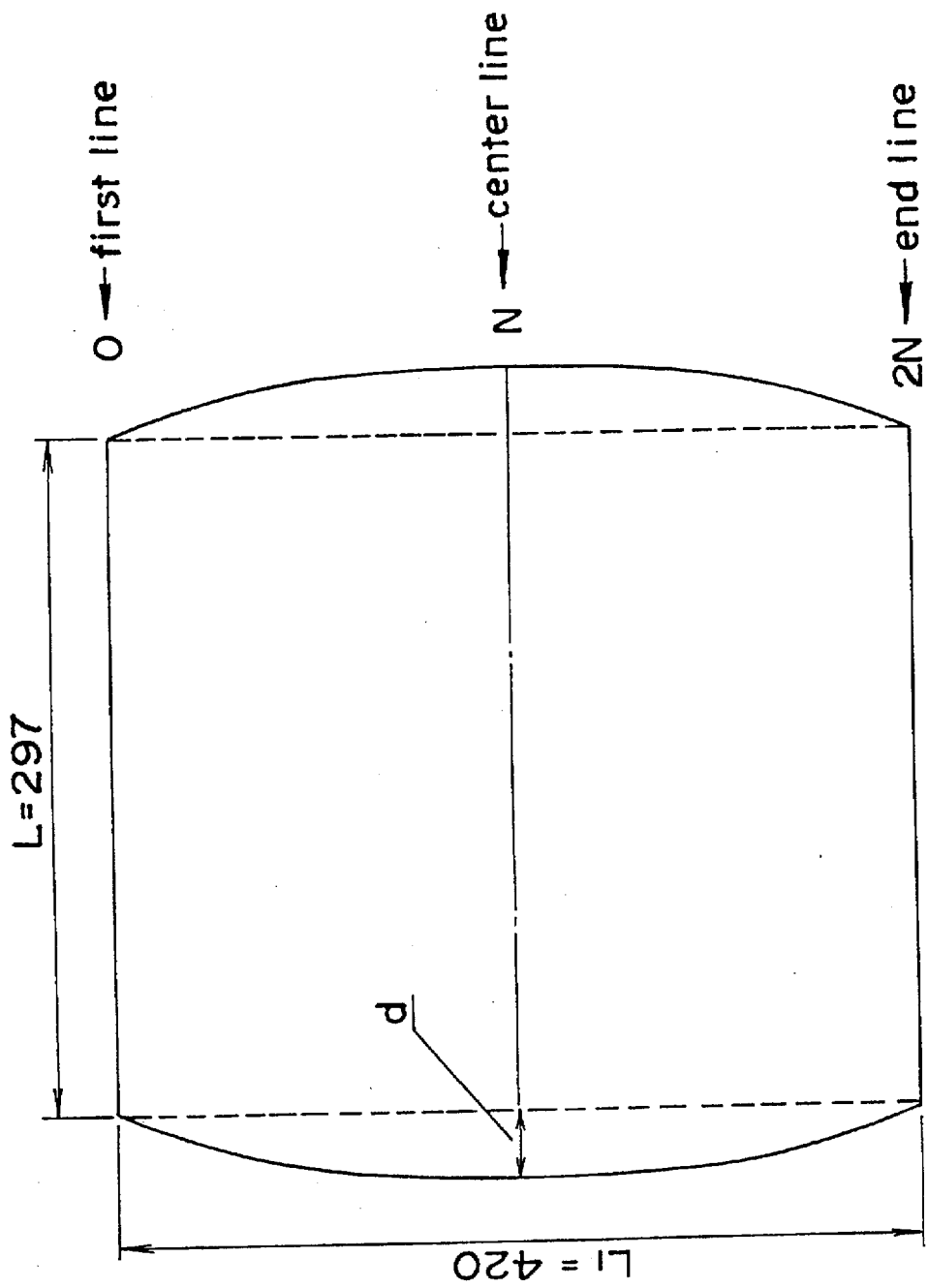

|—— true image size ——| image having barrel form distortion image reduced by magnification process

|—— shifted image ——|

FIG. 14

| DATA 0 | NO DATA |
|---|---|
| DATA 1 | Distortion ratio of simple forcusing lens of 7.5x |
| DATA 2 | Distortion ratio of zoom lens of 9x to 16x (9x) |
| DATA 3 | Distortion ratio of zoom lens of 9x to 16x (10x) |
| DATA 4 | Distortion ratio of zoom lens of 9x to 16x (11x) |
| → | ↓ |
| DATA 9 | Distortion ratio of zoom lens of 9x to 16x (16x) |
| DATA 10 | Distortion ratio of zoom lens of 13x to 27x (13x) |
| DATA 11 | Distortion ratio of zoom lens of 13x to 27x (14x) |
| → | ↓ |
| DATA 24 | Distortion ratio of zoom lens of 13x to 27x (27x) |

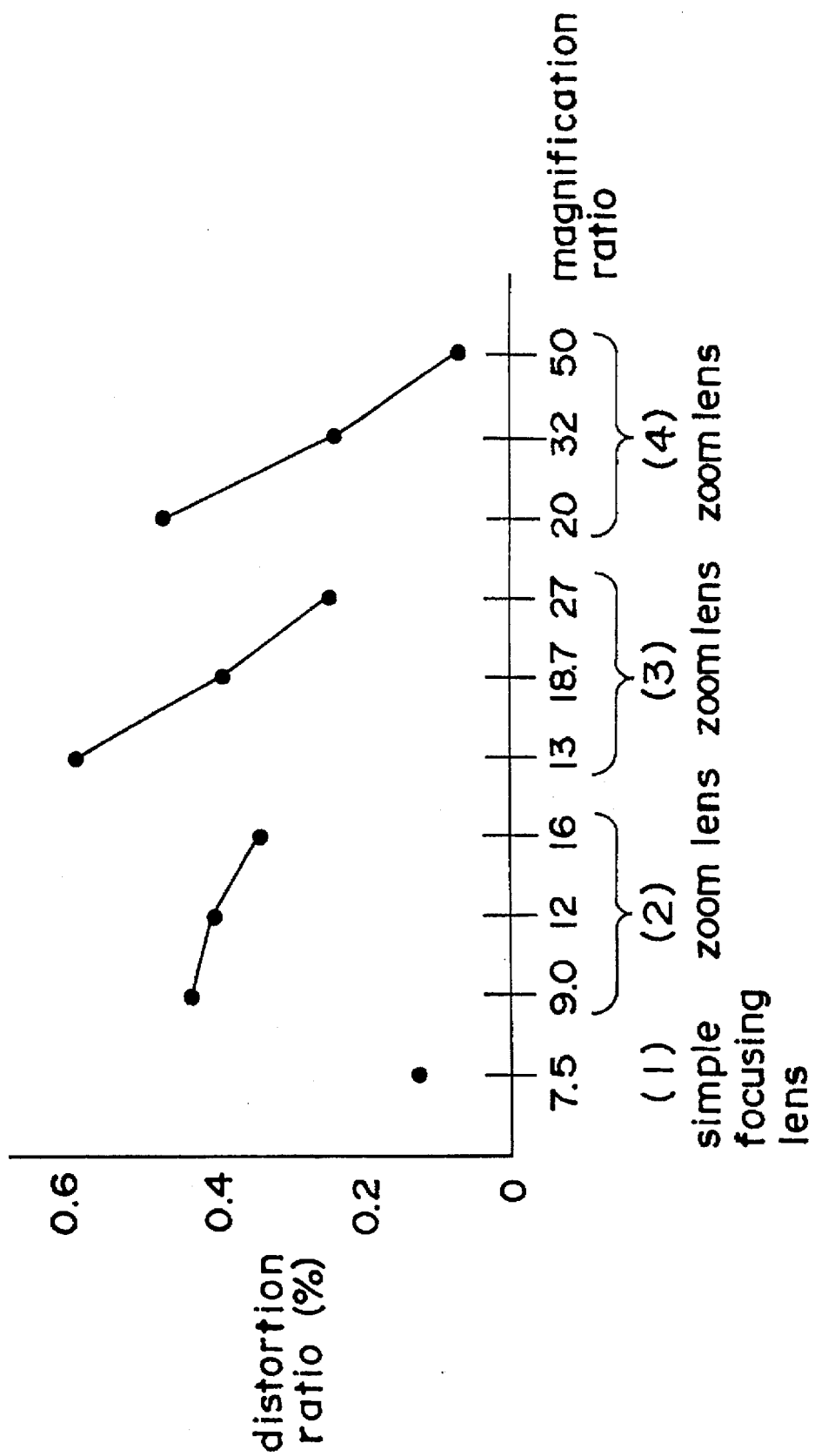

IMAGE READER

BACKGROUND OF THE INVENTION

1. Field of the Invention

The present invention relates to an image reader such as a microfilm reader/scanner and the like which scan and read an optical projection of an image on film.

2. Description of the Related Art

Conventional microfilm reader/scanners read images by scanning a projected image using a mirror oscillation method.

The mirror oscillation method is advantageous inasmuch as it is inexpensive and conserves space due to the simplicity of its construction and, therefore, has come to be used in many image readers.

The mirror oscillation method, however, is disadvantageous insofar as it produces barrel form distortion in the read image, as shown in FIG. 16(b).

Although this distortion is not a significant disadvantage when reading text or the like, it is desirable from the users point of view to eliminate such distortion in the case of drawings because lines become distorted.

Examples of conventional art for eliminating such distortion are disclose din Japanese Laid-Open Patent Application Nos. SHO 62–267716 and SHO 64–54433, wherein the aforesaid distortion is reduced by controlling the rotation of a scanning mirror in accordance with the amount of movement of said scanning mirror which is mechanically moved linearly or circularly.

Reading devices such as microfilm scanners and the like, in addition to barrel form image distortion due to mirror oscillation, are also susceptible to the image distortion shown in FIG. 18 produced by the characteristics of the optical system, such as the properties of the projection lens and the like.

Barrel form image distortion due to mirror oscillation and image distortion due to characteristics of optical systems such as the properties of the projection lens are described hereinafter.

FIG. 15 is a conceptual illustration of a microfilm scanner using the mirror oscillation method (hereinafter referred to as "scanner"). When the image of microfilm 3 is projected on screen 7, light emitted from a light source 1 passes through a condenser lens 2 and transmitted through microfilm 3, so as to be projected on a screen 7 via a projection lens 4. At this time, a scanning mirror 5 is retracted to a position which does not obstruct the optical path from projection lens 4 to screen 7 (i.e., the position indicated by the dashed line in the drawing). During image reading, the scanning mirror 5 advances within the optical path of projection lens 4 and screen 7 (i.e., the position indicated by the solid line in the drawing). The scanning mirror 5 scans the projection image on a charge-coupled device line image sensor 6 (hereinafter referred to as "CCD") via the rotation of the scanning mirror oscillation).

At this time, the image projected on CCD 6 is an image having barrel form distortion wherein the center portion of the image is swollen relative to the original image shown in FIG. 16(a) due to the different optical path lengths from the microfilm 3 to CCD 6 of the edge of the image and the center of the image.

Distortion caused by the aforesaid mirror oscillation is described below with reference to the illustration of the optical path shown in FIG. 17.

Although barrel form distortion does not occur when light from projection lens 4 forms an image on screen 7 (i.e., there is not distortion via the lens), the light directed to CCD 6 by the scanning mirror 5 is subject to barrel form distortion due to changes of the optical path length in accordance with mirror rotation positions M1, M0, M2. The optical path from the projection lens 4 to CCD 6 is P-S1-C when the mirror rotation position is M1, i.e., when the top edge of the projection image is read, and said optical path is P-S0-C when the mirror rotation position is M0, i.e., when the center portion of the projection image is read, and said optical path is P-S2-2 when the mirror rotation position is M2, i.e., when the bottom edge of the projection image is read. As can be understood from the illustration, the optical path P-S0-C when reading the center of the projection image is clearly longer than wither the optical path P-S1-C when reading the top edge of the projection image or optical path P-S2-C when reading the bottom edge of the projection image. Thus, the projection magnification of the center area to CCD 6 is greater than the projection magnification of the top edge and bottom edge areas, so as to produce barrel form distortion. The amount of distortion d due to mirror oscillation is several percent relative to the scan length L (d and L direction in FIG.16(b)), and increases as the conjugate length of the lens (in a scan, the distance from projection lens 4 to CCD 6) is reduced. This barrel form distortion is device specific and depends on the position of the scanning mirror and the position of the CCD, and is normally a constant ratio regardless of lens characteristics. Therefore, when the scanning device itself becomes smaller, the lens conjugate distance must become smaller and barrel form distortion increases.

Image distortion due to properties of the optical system such as the projection lens characteristics and the like are described below. FIG. 18 shows one example of such distortion, wherein image distortion due to optical system properties such as the characteristics of the projection lens are indicated by the dashed lines. Although the distortion indicated by the dashed lines is a pincushion form distortion, barrel form distortion occurs depending on the type of projection lens and projection magnification. The magnitude of the distortion is such that distortion d3 of the area in the width direction (direction CD in the drawing) is normally less than the distortion d2 of the area in the length direction (direction FD in the drawing). Furthermore, distortion d1 indicated by the solid lines in the drawing is a composite of distortion due to mirror oscillation and distortion due to properties of the optical system such as characteristics of the projection lens and the like. An object of the present invention is to eliminate the aforesaid distortion d1.

Since the distortion caused by mirror oscillation does not arise in the CD direction which is perpendicular to the scanning direction, distortion in the CD direction is only d3 type distortion caused by the projection lens and the like. The distortion d3 is exceptionally minute compared to distortion d1, and thus may be ignored. Accordingly, the object of distortion correction is distortion d1 in the FD direction. The distortion ratio K of distortion d1 is designated K=d1/L1.

FIG. 19 shows the distortion ratio of the projection lens. Specifically, the drawing shows: (1) simple focusing lens of 7.5× magnification, (2) zoom lens of 9× to 16× magnification, (3) zoom lens of 13× to 27× magnification, (4) zoom lens of 20× to 50× magnification. The change in distortion ratio in accordance with the zoom lens magnification can be read from the drawing. Thus, when zoom lenses are used as a projection lens, it is necessary to change the amount of correction of the distortion of the combined magnifications.

In the inventions of the previously mentioned disclosures, only the distortion due to mirror oscillation is corrected, whereas the distortion caused by the projection lens is not addressed. Therefore, the distortion caused by the projection lens is not corrected by the aforesaid inventions. It is particularly desirable in the case of zoom lenses to prevent correction of distortion due to variable magnification because the magnitude of the distortion caused by variable magnification changes. Furthermore, in the aforesaid disclosures, a mechanical construction is required to move a scanning mirror in addition to rotating said scanning mirror, and such mechanical construction is complex so as to nullify the advantages of low cost and space conservation of the mirror oscillation method.

SUMMARY OF THE INVENTION

An object of the present invention is to eliminate distortion of a read image in an image reader using a mirror oscillation method.

Another object of the present invention is to provide an image reader capable of producing distortionless images relative to distortion due to mirror oscillation and distortion changes in accordance with lens type and zoom value without mechanically moving a mirror position.

A still further object of the present invention is to provide an image reader capable of correcting image distortion caused by lens distortion in an image reader using a mirror oscillation method.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 4 shows data for the distortion rations due to mirror oscillation and projection lens;

FIG. 5 shows a specific example of correcting image distortion;

FIG. 14 illustrates the stored data of the distortion ratio caused by the lens in another microfilm reader/scanner of the present invention;

FIG. 19 shows the changes of the distortion ratio via the magnification value of a projection lens, In the following description, like parts are designated by like reference numbers throughout the several drawings.

DESCRIPTION OF THE PREFERRED EMBODIMENTS

First and second embodiments of the present invention are described hereinafter with reference to the accompanying drawings.

First Embodiment

Figure 1:
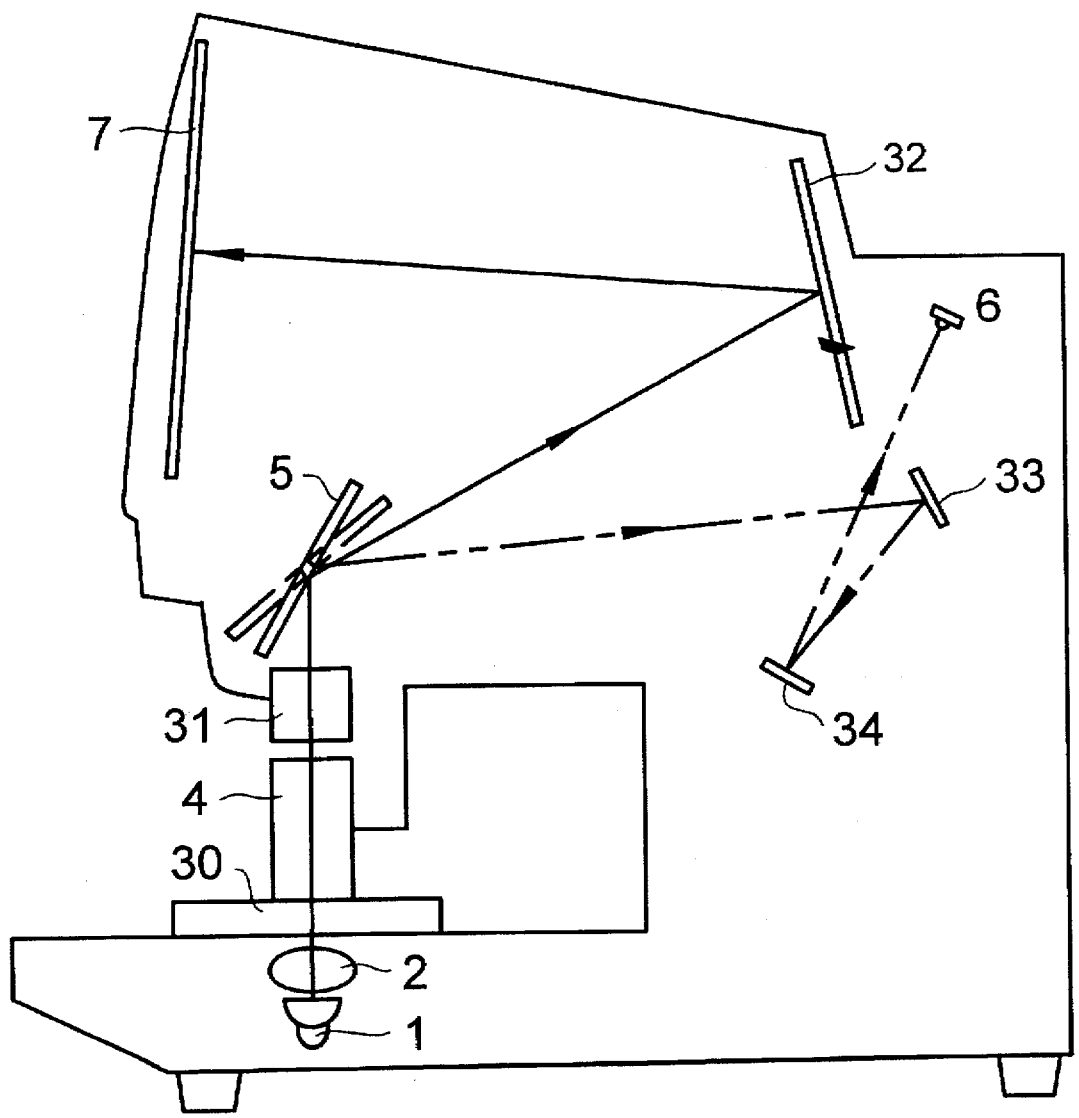
FIG. 1 briefly shows a first embodiment of a microfilm reader/scanner.
Figure 2:
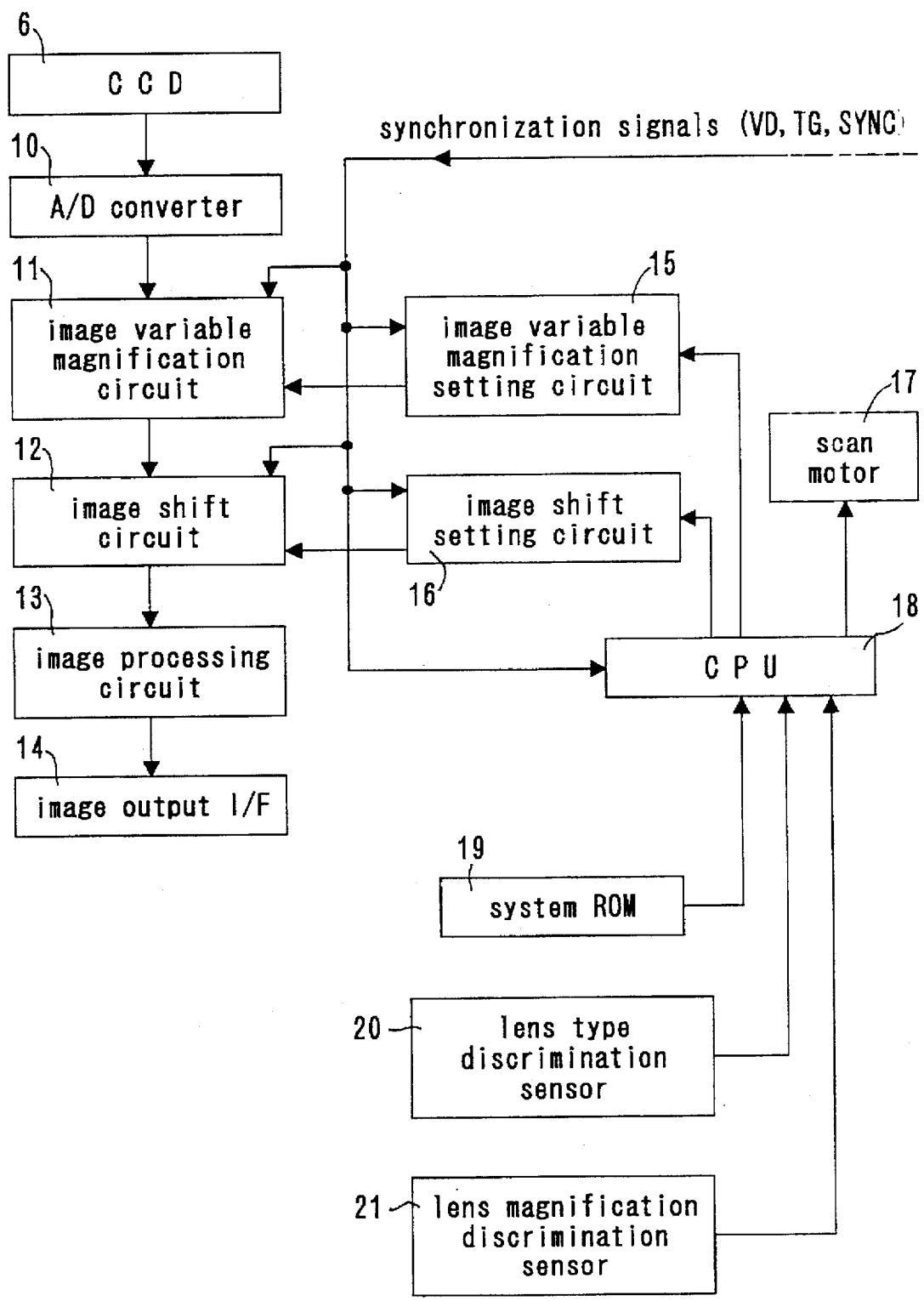
FIG. 2 a block diagram of the control unit of the microfilm scanner.

FIG. 1 briefly shows the construction of a microfilm reader/scanner of a mirror oscillation scanning type (hereinafter simply referred to as "scanner"). FIG. 2 is a block diagram showing the construction of the control unit of the scanner of FIG. 1.

The light transmitted through the microfilm is directed to image rotation prism 31 via projection lens 4. The image rotation prism 31 has the function of rotating an image from the projection lens 4 to an optional angle. An image from a projection lens 4 is directed to scanning mirror 5 for deflection scanning of an image via mirror oscillation. This scanning mirror 5 is provided with a function for switchably selecting either a scanning mode optical for electrically reading path a microfilm image (dashed line in the drawing), or an reader mode optical path for projecting a microfilm image on screen 7 (solid line in the drawing, and is further provided with a function for deflection scanning (subscan) of a microfilm image during scanning.

When scanning mirror 5 is set at an angle such as that indicated by the solid line in the drawing, the reader optical path is set, and the image from projection lens 4 is inverted by reflection mirror 32, and enlarged and projected on screen 7. On the other hand, when scanning mirror 5 is set at the angle indicated by the dashed line in the drawing, the scanning mode optical path is set, and the image from projection lens 4 is directed onto CCD 6 via reflection mirrors 33 and 34. The scanning operation for reading the images of the entire microfilm is accomplished by changing the angle of scanning mirror 5 synchronously with the reading scan (main scan) of CCD 6.

Scanning mirror 5 is driven by scan motor 17. A pulse motor is used for scan motor 17 because accurate scanning speed control is required during the scanning operation. The drive pulse of scan motor 17 is synchronized with the drive pulse of CCD 6 in the main scan direction, such that scanning mirror 5 is oscillated a predetermined amount (amount per line) for the reading of each line in the main scan direction.

This scanner is normally set in the reader mode, and the scanning mode is set a scanning command is received.

The image signals obtained by CCD 6 are processed by the control unit shown in FIG. 2.

In this control unit, CPU 18 reads the distortion ratio related to mirror oscillation and the distortion ratios related to the projection lens and magnification value from system ROM 19, and combines said data.

The distortion ratios related to the projection lens and magnification value are selected from among distortion ratios stored in system ROM 19 by determining the type of projection lens currently used and the current magnification value when a zoom lens is used as the projection lens via signals from projection lens discrimination sensor 20 and lens magnification discrimination sensor 21 (i.e., the number of input pulses to the pulse motor to accomplish the electrically driven zoom operation). projection lens discrimination and zoom value discrimination are described later in detail.

Figure 3:
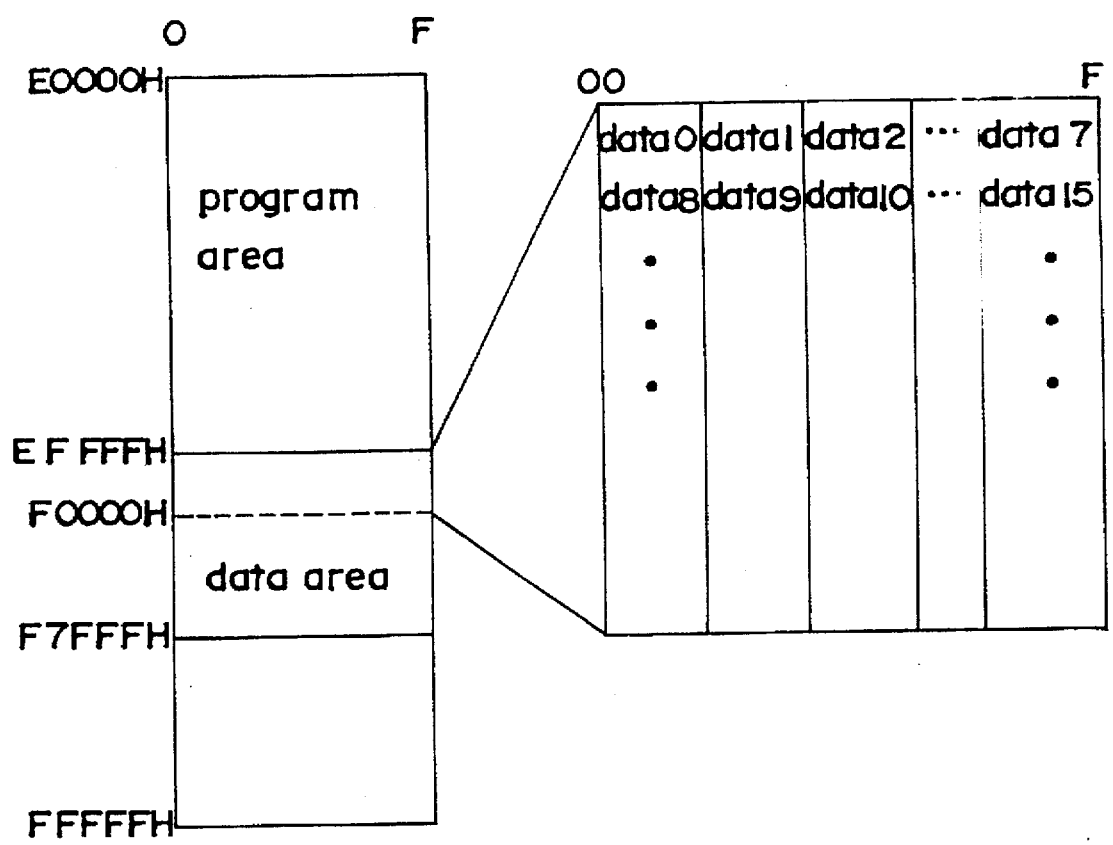
FIG. 3 the memory area of the system ROM.

FIG. 3 illustrates system ROM 19 for storing distortion ratio data.

The distortion ratios are stored in the area from address EFFFFH to address F0000H of system ROM 19.

The stored distortion ratios are the distortion ratio due to mirror oscillation inherent to the scanner, and two types of distortion corresponding to the zoom magnification value and type of lens used in the scanner.

FIG. 4 illustrates data stored at addresses EFFFFH to F0000H.

The stored distortion ratios correspond to various magnification values such as a distortion rate due to mirror oscillation at data 0, distortion of a simple focusing lens of 7.5× magnification at data 1, and distortion of zoom lenses of 9× to 16× magnification at data 2 through 9. Although the aforesaid distortion ratio data are stored in ROM 19 in the present embodiment as a means of knowing beforehand what type of projection lens is used in the scanner, when other projection lenses are used, a distortion ratio may be input which corresponds to the projection lens used later and its magnification value, and said data may be stored in a data RAM or the like not shown in the illustration.

Furthermore, since the distortion ratio due to mirror oscillation among the aforesaid data of distortion ratios is a value inherent to the scanner as previously explained, this distortion ratio caused by such mirror oscillation may be added beforehand to the distortion ratio of each projection lens and used as distortion ratio data.

As shown in FIG. 2, the distortion ratio combined by CPU 18 is transmitted to both the image variably magnification setting circuit 15 to calculate the corrected magnification for each line of the main scan and the image shift setting circuit 16 to correct dislocation in the main scan direction caused by said variable magnification, the among of variable magnification and amount of image shift are respectively set, and the set amount variable magnification and set amount of image shift are transmitted to the image variable magnification circuit 11 and the image shift circuit 12.

The amount of variable magnification and amount of image shift are calculated per each 1line and synchronized with various synchronization signals (e.g., read image validation signal VD, horizontal synchronization signal TG, synchronization signal SYNC and the like) generated by an image synchronization signal generating circuit not shown in the drawing.

Specific examples of distortion correction accomplished by the image variable magnification setting circuit 15 and image shift setting circuit 16 are described below.

The image variable magnification setting circuit 15 utilizes a combined distortion ratio K which is a combination of the distortion ratio due to mirror oscillation and the distortion ratio of the projection lens currently used in the scanner which are read from system ROM 19 by CPU 18.

The image variable magnification setting circuit 15 determines a corrected magnification for image correction in accordance with said distortion ratio K for each line in the main scan direction (scanning direction of CCD 6), and executes a variable magnification process of the read image.

The read image is such that the center area of the image has the largest distortion ratio, as shown in FIG. 5. When a read line of the center area of the image is designated the Nth line, the maximum distortion amount d can be expressed as the product of the magnitude L1 of the image in the subscan direction and the distortion ratio K, i.e., d=L1·K. For example, when the size of an image is set at A3 and the density read by CCD 6 is set at 400 dpi, one line in the main scan direction is 63.5×103 mm, and the center area of the A3 image is 420/2=210 mm, such that the maximum distortion line N is N=210/63.5×103.

Thus, from the first line of the image (line 0) to the center line of the image (line N) the corrected magnification m of each read line is $$m(\%) = L2/(L2 + L1 \cdot k \cdot (n/N)) \times 100 \quad (1)$$

where n of eq. 1 is line number 0 through N, and from the center line of the image (line N) to the final line of the image (line 2N) the corrected magnification m of each line is $$m(\%) = L2/(L2L1 \cdot k \cdot ((n-N)/N)) \times 100 \quad (2)$$

Image correction is accomplished by subjecting a read image to the variable magnification process via the corrected magnification of each line determined in the previously described manner.

It is necessary to correct the image position when the variable magnification process is performed because image position is shifted by the change in magnification. Specific examples of methods for correcting this image position shift are described below.

First, the distortion ratio K of the combined distortion ratio of mirror oscillation and distortion ratio of the projection lens currently used in the scanner are read from system ROM 19 via CPU 18 and used in the image shift setting circuit 16.

The image shift setting circuit 16 determines the amount of image shift for image correction in accordance with the aforesaid distortion ratio K for each line in the main scan direction to shift the position of the read image.

The variable magnification process and image position shift are illustrated in FIGS. 6(a) to (d). As shown in the drawing, when a read image (b) has barrel form distortion relative to the true image size (a) of a particular line, the read image is larger. When the variable magnification process is executed by corrected magnification m determined in the previously described manner, this standard is set as the head of the line to unify the image position with the head of read image (b) so as to shift the position of the entire image (c).

Accordingly, image (c) which has been subjected to the variable magnification process must be shifted to the true image position. At this time, from the first line (line 0) of the image to the center line (line N) of the image, the amount of shift S is $$S(dots) = K \cdot (n/N) \cdot (1/63.5 \times 103) \quad (3)$$

and from the center line of the image (line N) to the last line of the image (Line 2N) the amount of shift S is $$S(dots) = K \cdot ((n-1)/N) \cdot (1/63.5 \times 103) \quad (4)$$

Figures 6A, 6B, 6C, 6D:
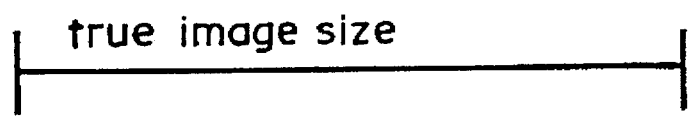
FIGS. 6(a) to 6(d) show a specific example of correcting image distortion.

The image of the 1-line subjected to variable magnification is shifted by the determined amount of shift S so as to match the true image position (FIG. 6(d)).

A corrected image is obtained by performing a variable magnification process corresponding to the distortion ratio of the combined distortion ratio due to the lens and the distortion ratio due to mirror oscillation for each line of the read image. The examples above strictly pertain to the present invention, but the present invention is not limited to this correction method.

On the other hand, an image read and photoelectrically converted by CCD 6 is output as analog image data, which are converted to digital signals by analog-to-digital (A/D) conversion circuit 10. Then, the digital data are input to image variable magnification circuit 11, and the head of each 1-line in the main scan direction is set as a standard and subjected to a variable magnification process based on the magnification amount transmitted from the image variable magnification setting circuit 15 to achieve distortion correction. Then, the data are input to the image shifting circuit 12, and the image position dislocation caused by the variable magnification is corrected based on the amount of shift transmitted from the image shift setting circuit. Thereafter, the data are input to the image processing circuit 13 to accomplish image quality correction, e.g., shading correction, gamma correction and the like, and said corrected data are output from image output I/F 14.

Figure 7:
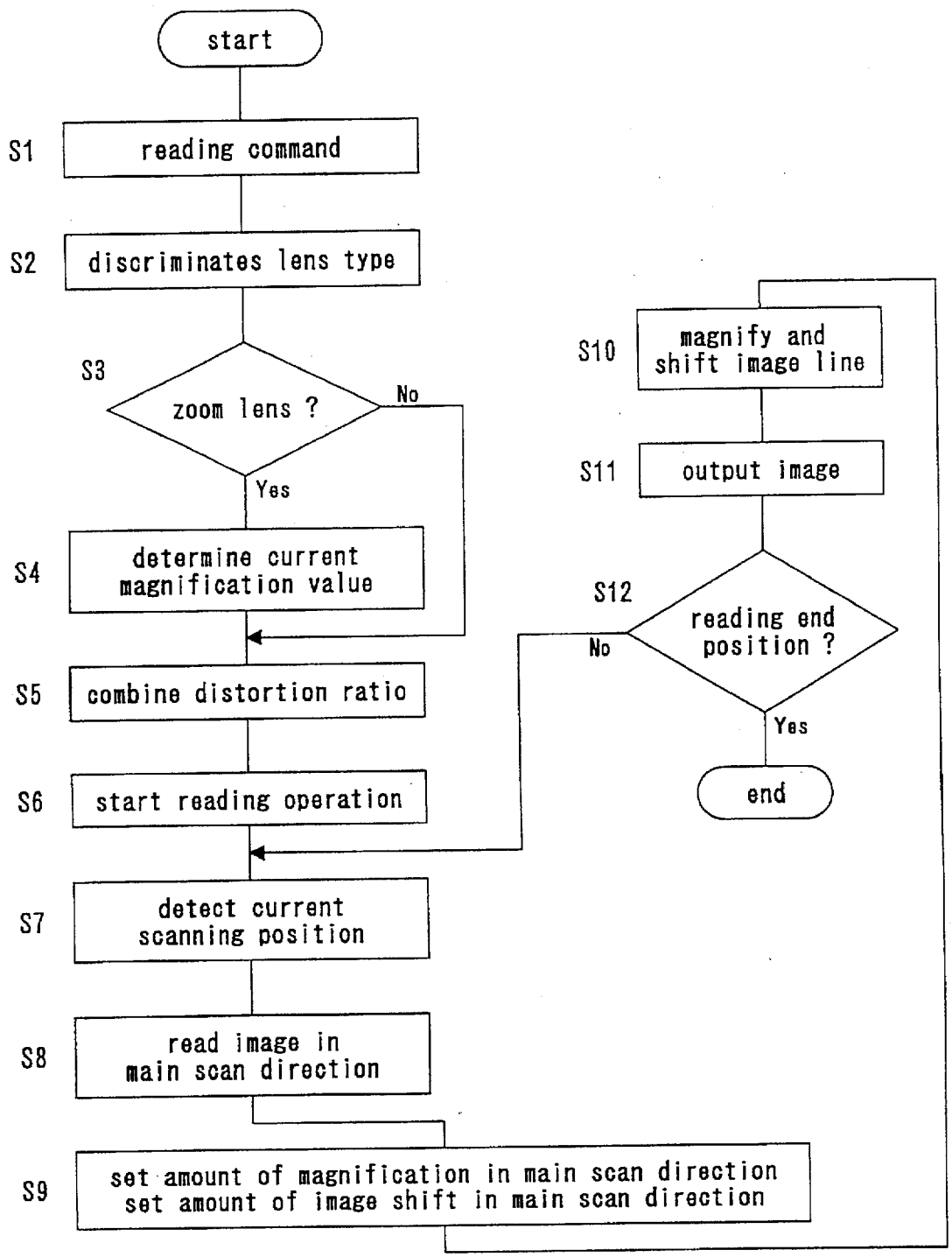
FIG. 7 is a flow chart of the controls executed by CPU 18.

The distortion correction operation executed by the control unit is described hereinafter with reference to the flow chart shown in FIG. 7.

First, when an image scanning command is issued (S1), CPU 18 discriminates whether the projection lens being used is a simple focusing lens or a zoom lens by means of signals from lens type discrimination sensor 20 (S2). In step S3, when the projection lens has been determined to be a zoom lens, the current magnification value is determined via the number of pulses of the pulse motor which changes the magnification value in a manner described later (S4). Further, in step S3, when projection lens has been determined to be a simple focusing lens, the routine advances to step S5.

Subsequently, the distortion ratio due to mirror oscillation inherent to the scanner and the distortion ratio corresponding to the magnification value and the discriminated type of projection lens are read from system ROM 19 to determine a composite distortion ratio (S5).

The scanning motor 17 is actuated to oscillate the scanning mirror 5, and the image reading operation starts (S6). At this time, the read image area reaches CCD 6 via the rotation of the scanning mirror 5 and an image validation signal VD is turned ON.

The current scanning position in the subscan direction is detected by counting the number of horizontal synchronization signal TG after the image validation signal VD is turned ON. That is, the number of the current line in the subscan direction is detected (S7).

Then, the line at the aforesaid position in the main scan direction is read (S8).

The amount of variable magnification and amount of image shift corresponding to the detected line position in the main scan direction are obtained from the image variable magnification setting circuit 15 and the image shift setting circuit 16 (S9), and the image of said line is magnified and shifted accordingly (S10). After said magnification and shifting, the line image is output (S11).

A determination is made as to whether or not the reading end position has been attained (S12). If the end position has not been reached, the processes of steps S7 through S12 are repeated until all lines of the read image have been output. Distortion of the read image is corrected as described above.

The construction of the apparatus is described below in terms of discrimination of the type of projection lens and discrimination of the magnification value.

Figure 8:
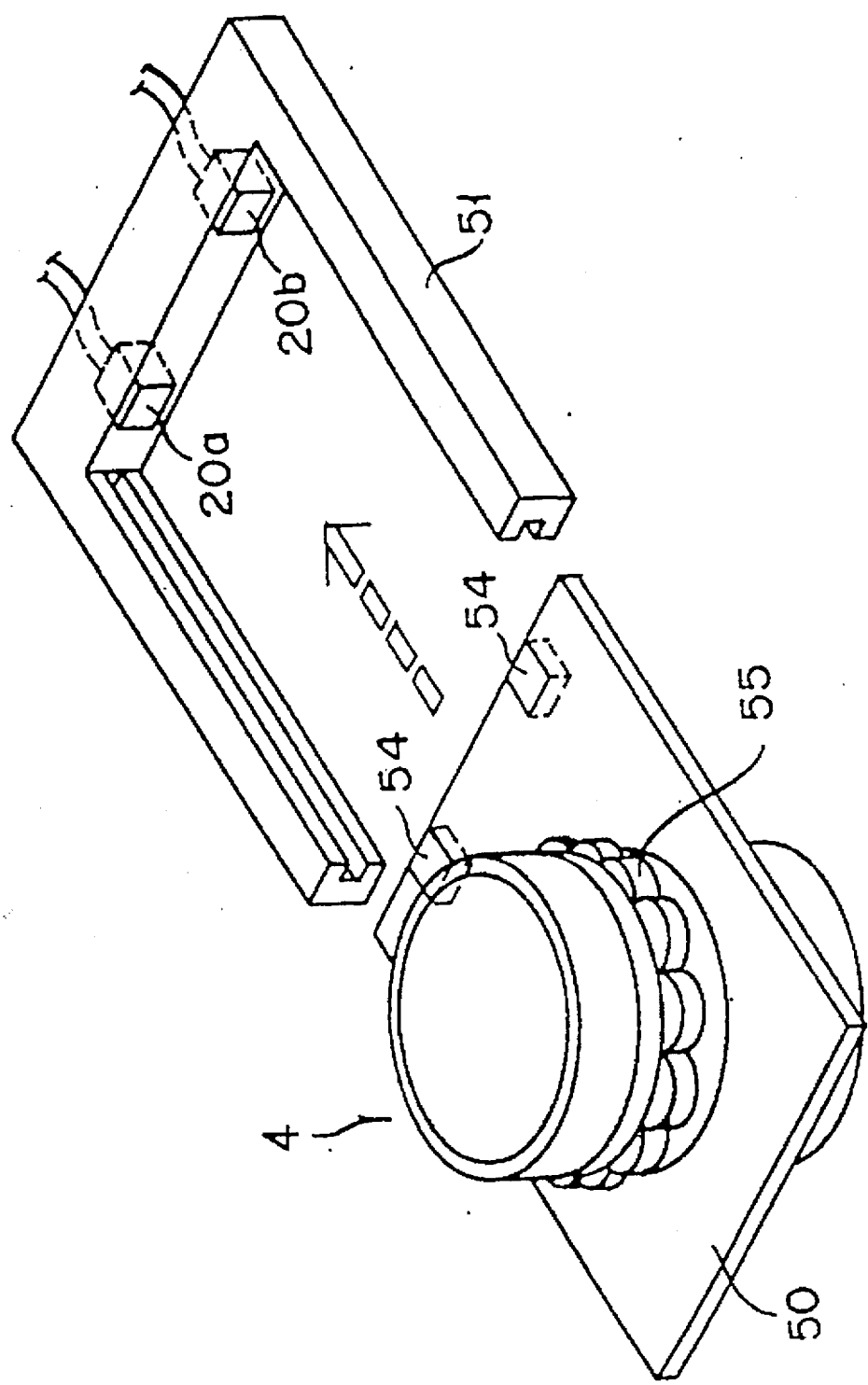
FIG. 8 is perspective view of a projection lens type discrimination mechanism.
Figure 9A:
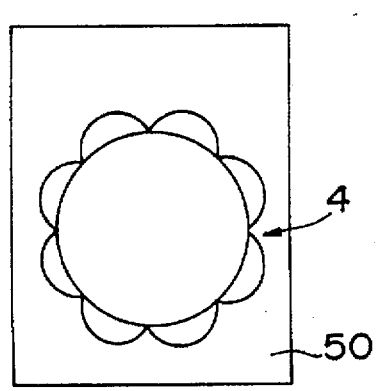
FIG. 9(a) to 9(d) illustrate the arrangement of magnets for projection lens type discrimination.
Figure 9B:
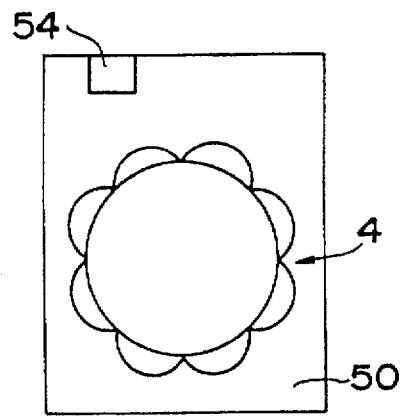
Figure 9C:
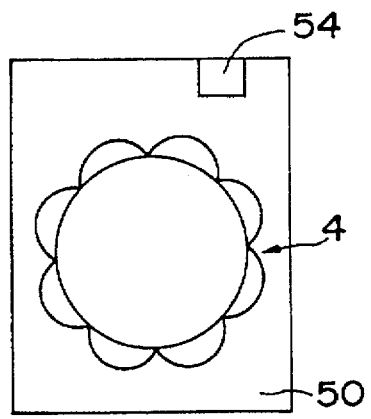
Figure 9D:
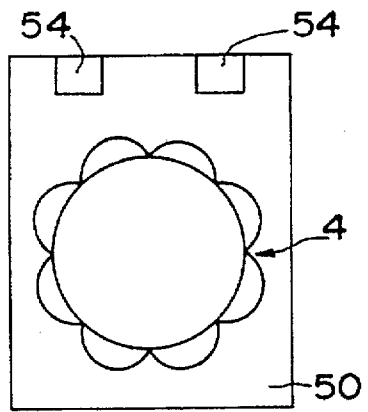

FIG. 8 is an enlargement of the periphery of the scanner lens. The projection lens 4 used in this scanner is completely mounted on lens holder 50 regardless of whether a simple focusing lens or zoom lens is used. Projection lens 4 is set by loading lens holder 50 on lens guide 51 provided on the scanner.

Lens guide 51 provided on the scanner has magnet sensors 20$a$ and 20$b$ as lens type sensors for discriminating the type of loaded projection lens 4. On the other hand, lens holder 50 is provided with magnets 54 at a position corresponding to sensor 20$a$ and sensor 20$b$ in accordance with the type of mounted projection lens 4, and the type of lens can be discriminated by CPU 18 via signals output from said sensors because either sensor 20$a$ or sensor 20$b$ or both sensors may detect the presence of magnets 54. Four types of lenses can be discriminated, for example, as shown in FIGS. 9($a$) through 9($d$), when a magnet is not provided at lens holder 51 ($a$), when one magnet is provides unilaterally on the side corresponding to sensor 20$a$($b$), when one magnet is provided unilaterally on the side corresponding to sensor 20$b$($c$), and when magnets are provided bilaterally ($d$).

Figure 10:
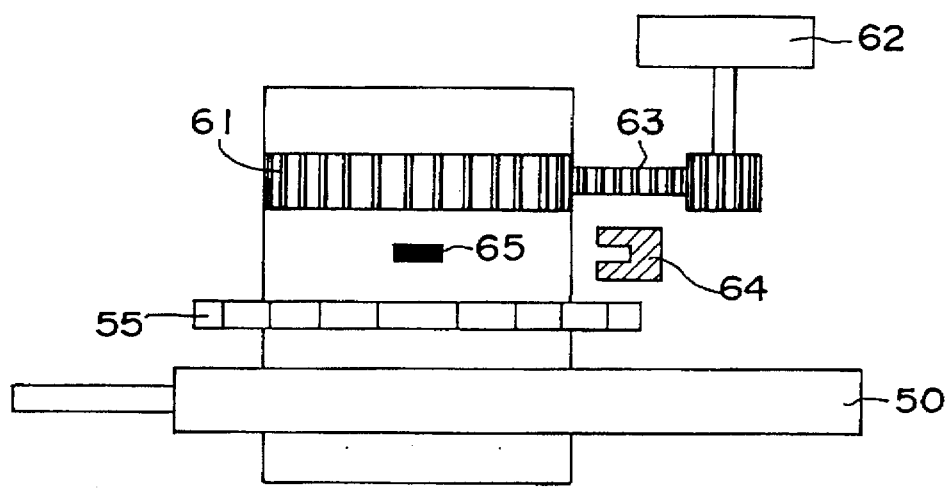
FIG. 10 is a side view of a magnification value discrimination mechanism.
Figure 11:
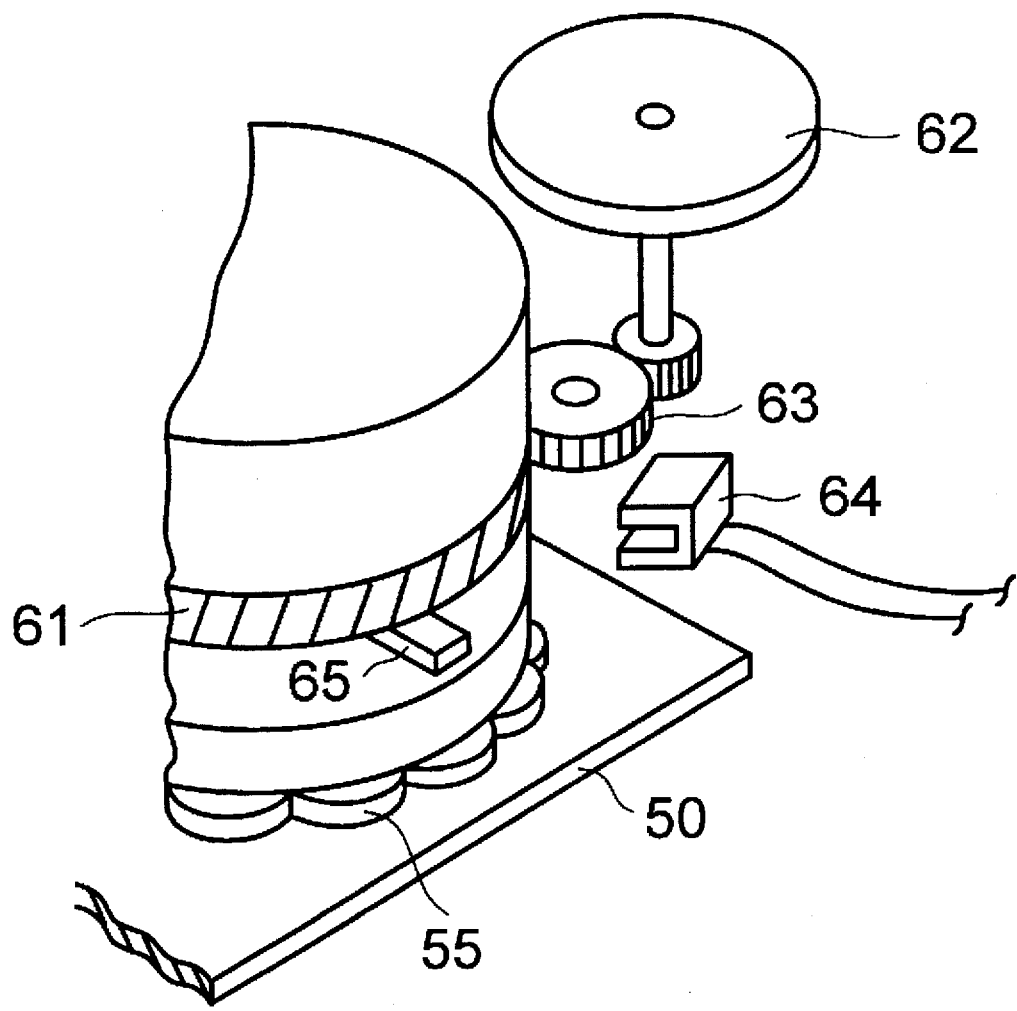
FIG. 11 perspective view of a magnification value discrimination mechanism.

Zoom value discrimination is accomplished using an electrically driven zoom lens as shown in FIGS. 10 and 11, and discriminating a zoom value by means of the number of pulses of a pulse motor used to rotate a zoom setting ring of said zoom lens.

When a zoom lens is set, the presence of magnets 54 provided on lens holder 50 are detected by sensors 20$a$ and 20$b$, and the set lens is discriminated as a zoom lens. Then, the stepping motor 62 is actuated to rotate zoom setting ring 61 via a gear 63 to the low magnification range. Thus, a zoom standard position projection 65, which is provided on zoom setting ring 61, is moved and inserted into a channel of a photocoupler 64 so as to black the light within said photocoupler 64 and detect the zoom value of the lowest magnification. Subsequently, stepping motor 62 is driven in accordance with the optionally set zoom value. At this time, CPU 18 determines the set zoom value by means of the number f pulses input to stepping motor 62. In FIGS. 8, and 10, the reference number 55 indicates the focusing ring.

Second Embodiment

Another embodiment of the present invention is described below.

Figure 12:
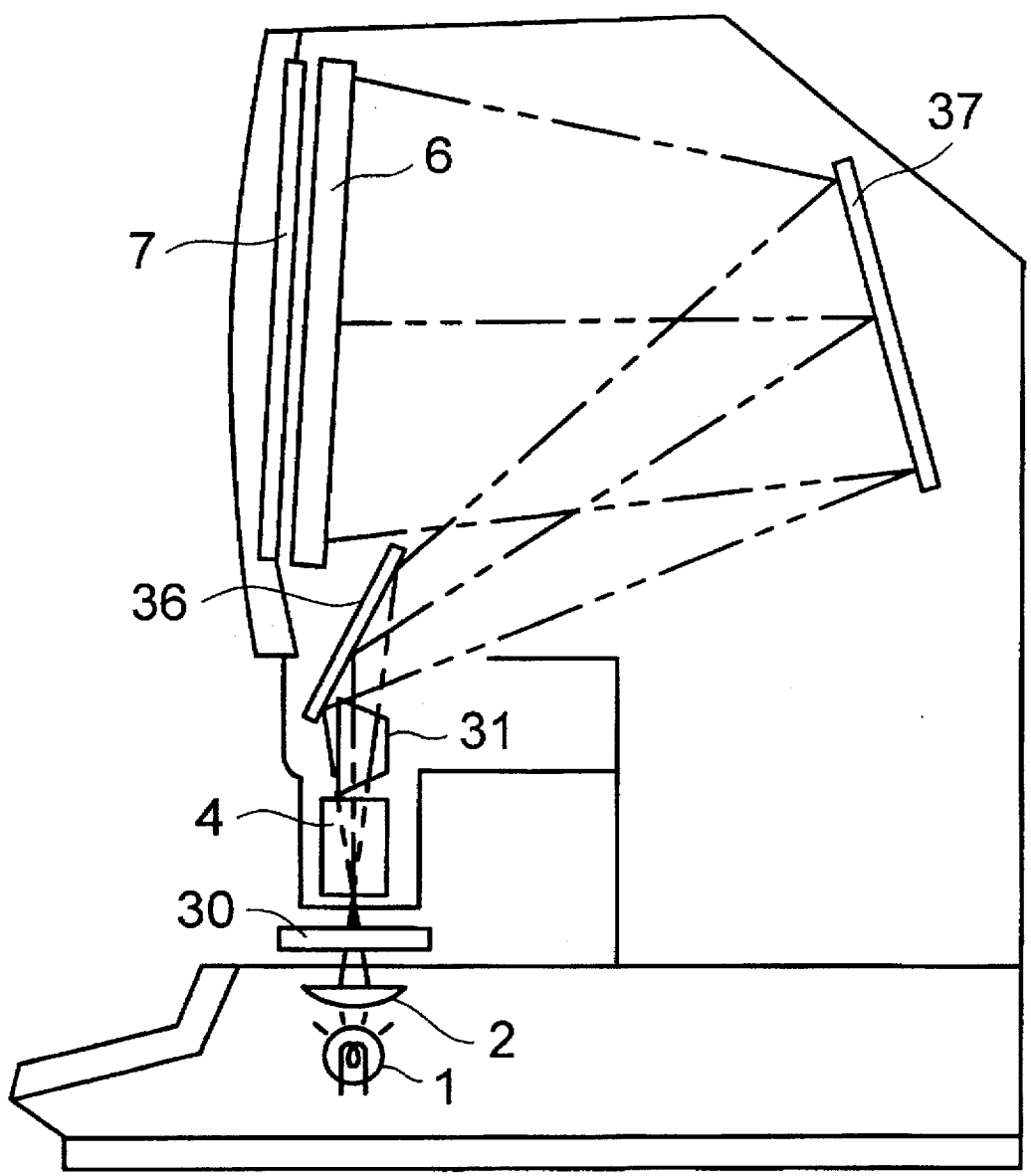
FIG. 12 briefly shows a second embodiment a microfilm reader/scanner.

FIG. 12 briefly shows the construction of another microfilm reader/scanner.

This scanner departs for the scanner of the first embodiment in that when reading a projected image the CCD line image sensor itself is moved to accomplish scanning and scanning is not accomplished via mirror oscillation.

A light source lamp 1 is provided at the bottom of the scanner, and light emitted from said lamp 1 is condensed by a condenser lens 2, and irradiates the microfilm placed on a microfilm carrier 30.

Figure 13:
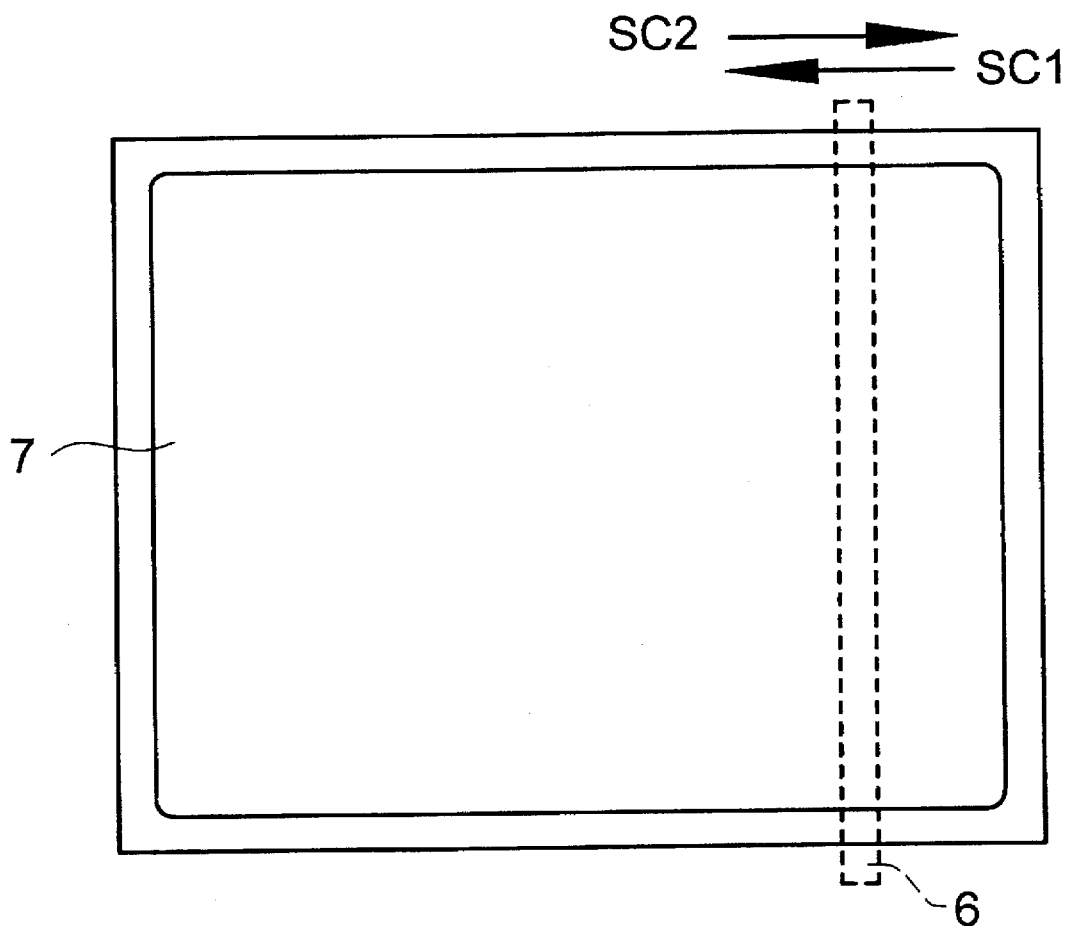
FIG. 13 illustrates the scanning movement of the CCD image sensor in another microfilm reader/scanner of present invention.
Figure 15:
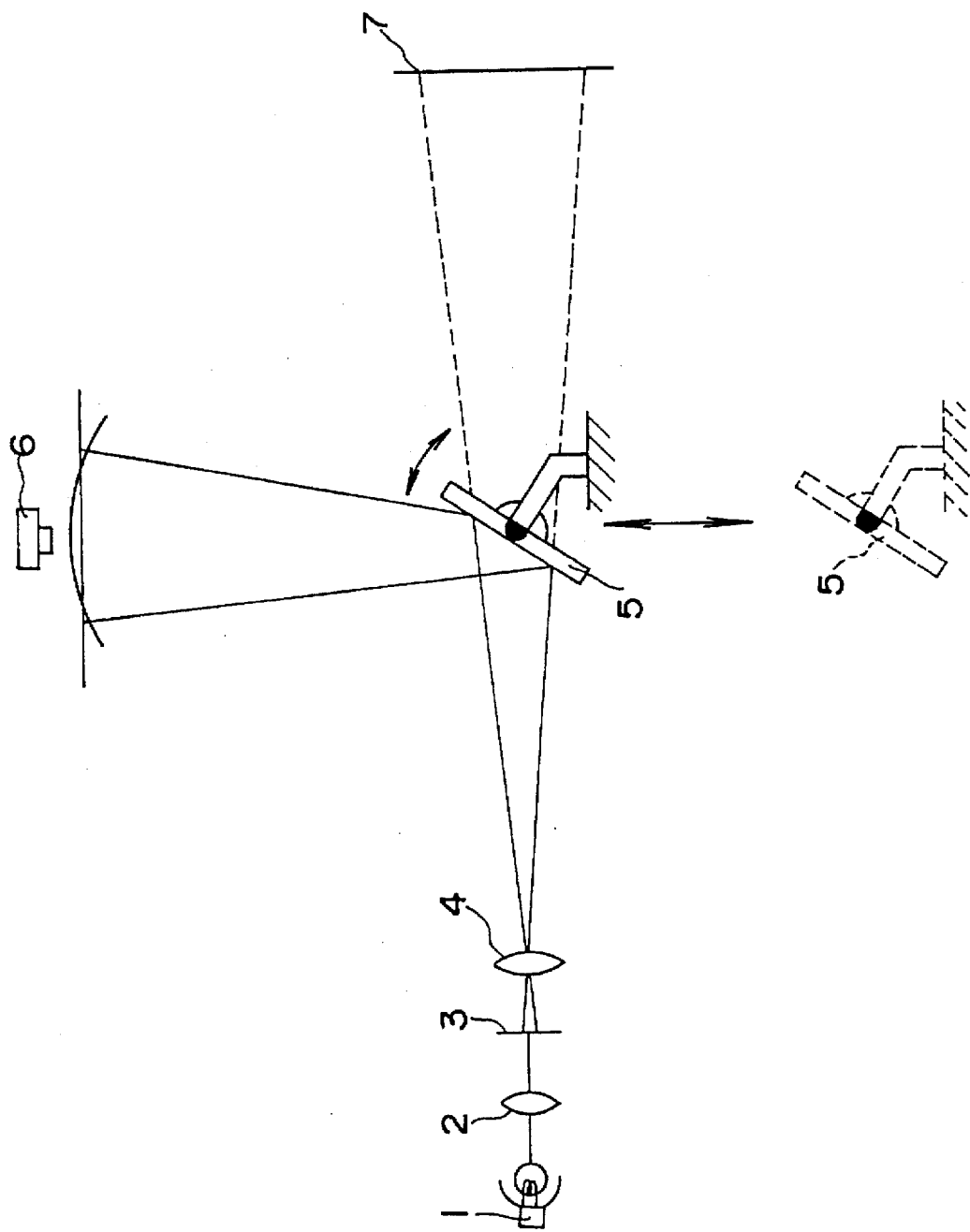
FIG. 15 shows an optical system for mirror oscillation scanning;.
Figure 16A:
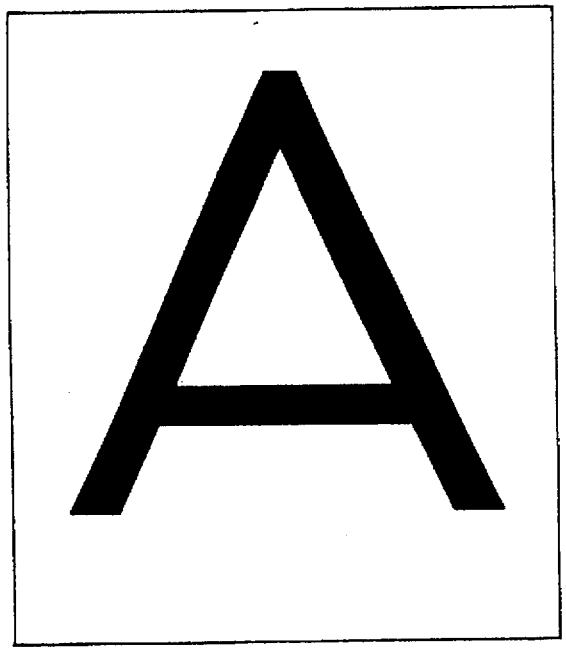
FIG. 16(a) illustrates original image.
Figure 16B:
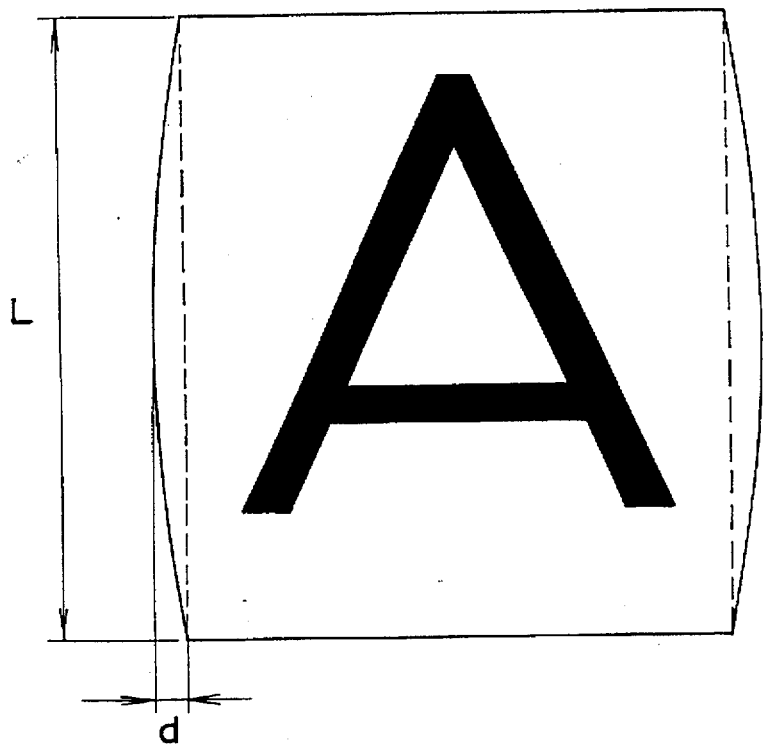
FIG. 16(b) illustrates image distortion arising from the mirror oscillation method.
Figure 17:
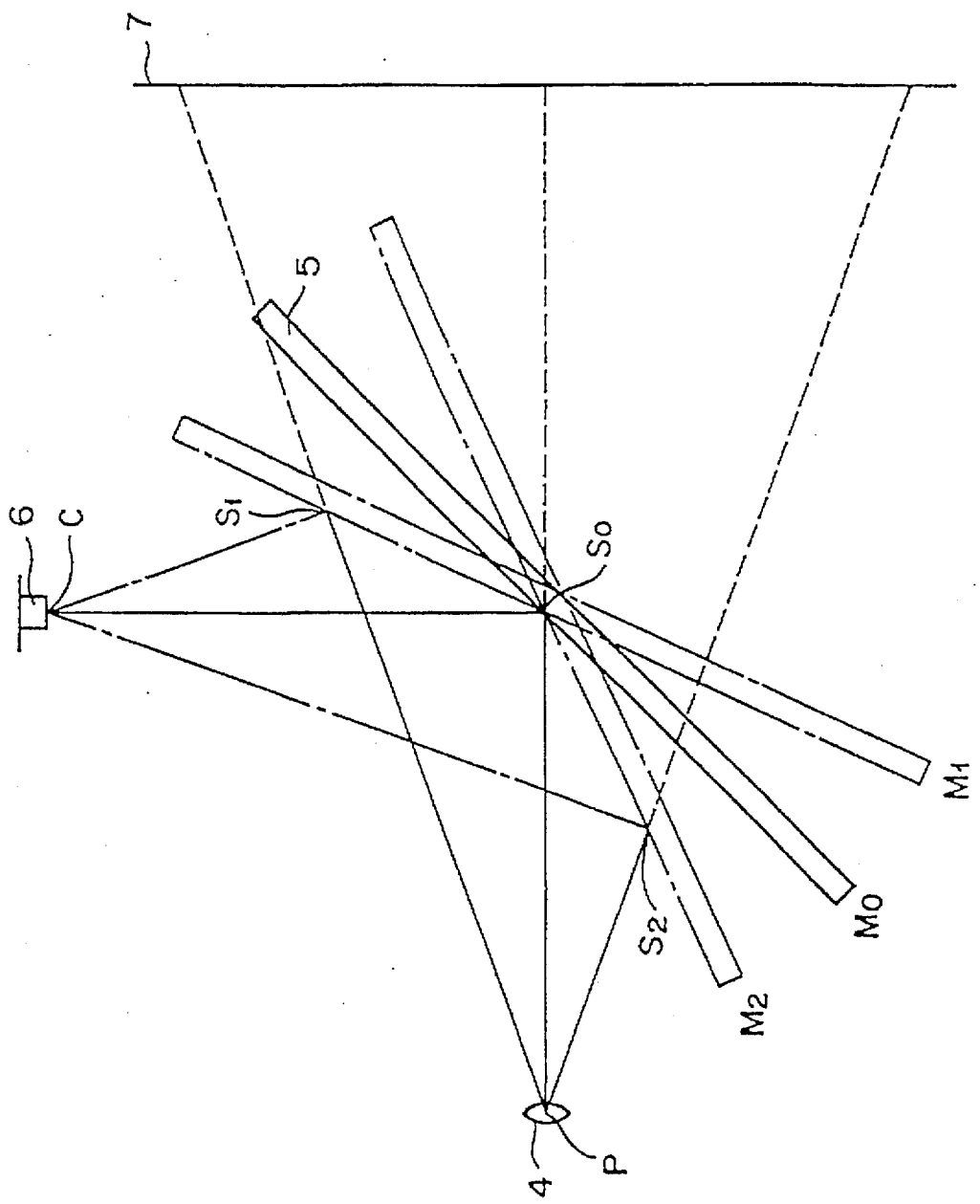
FIG. 17 illustrates the causes of distortion arising from the mirror oscillation method.
Figure 18:
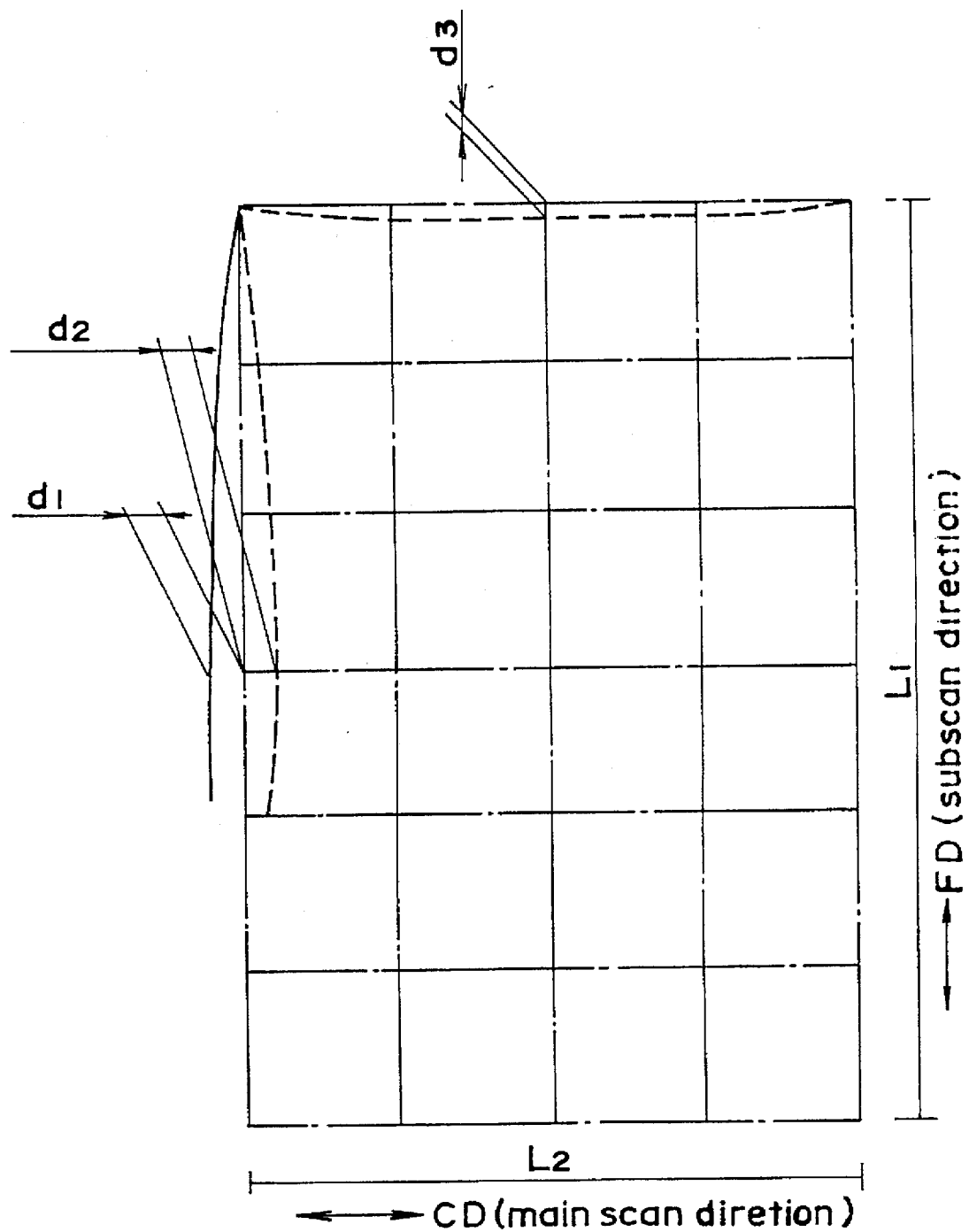
FIG. 18 shows image distortion due to the characteristics of a projection lens.

The light passing through the microfilm is directed to image rotation prism 31 via projection lens 4. Image rotation prism 31 has the function of rotating the image from the projection lens 4 to an optional angle. The image from projection lens 4 is directed by mirrors 36 and 37 so as to be projected on a screen 7. During image reading, CCD 6 which is movably provided behind screen 7 is moved so as to scan the back side of screen 7 in the subscan direction (arrow SC1 or SC2 in the drawing), as shown in FIG. 13, and read the projected image.

The construction of the control unit is identical to that of the first embodiment. As shown in FIG. 2, CPU 18 determines the type of projection lens currently used via signals from lens type sensors 20 and the zoom value sensor, determines the current magnification value when a zoom lens is used as the projection lens, and reads distortion ratio corresponding to the discriminated lens and lens magnification value stored in system ROM 19, and transmits said data to image variable magnification setting circuit 15 and image shift setting circuit 16.

The second embodiment differs from the first embodiment in that only the distortion of the projection lens is corrected because in the scanner of the second embodiment the mirror oscillation method is not used. Therefore, in the second embodiment, CPU 18 is not required to combine the distortion ratio due to mirror oscillation and distortion ratio due to the lens.

Furthermore, distortion ratios corresponding to predetermined lens types and zoom lens values are stored in system ROM 19, and similarly to the first embodiment said information is stored in the area of addresses EFFFFH to F0000H of system ROM 19. As shown in FIG. 14, the stored data include the distortion of a simple focusing lens of 7.5× magnification at data 1, distortion of zoom lenses of 9× to 16× magnification at data 2 through 9, and distortion ratios corresponding to each magnification value of the zoom lenses of 13× to 27× magnification are stored at data 10 through data 24. Accordingly, data 0 is empty. Although predetermined types of lenses are used in the scanner and the distortion ratio data are stored in system ROM 19 in the second embodiment, when other projection lenses are used, distortion ratios corresponding to the projection lens used and magnification values are input and stored in a data RAM not shown in the illustrations. Discrimination of projection lens type and discrimination of magnification value are identical to those of the first embodiment and, therefore, are not discussed further.

The distortion ratio transmitted from CPU 18 are used to calculate the corrected magnification of each line of the main scan via the image variable magnification setting circuit 15 and set the amount of variable magnification, and used to set the amount of shifting to correct the image dislocation arising from said variable magnification via image sift setting circuit 16.

Analog image data output from CCD 6 are converted to digital signals by A/D conversion circuit 10. Then, the digital data are input to image variable magnification circuit 11, and the head of each 1-line in the main scan direction is set as a standard and subjected to a variable magnification process based on the magnification amount transmitted from the image variable magnification setting circuit 15 to achieve distortion correction. Then, the data are input to the image shifting circuit 12, and the image position dislocation caused by the variable magnification is corrected based on the amount of shift transmitted from the image shift setting circuit. Thereafter, the data are input to the image processing circuit 13 to accomplish image quality correction, e.g., shading correction, gamma correction and the like, and said corrected data are output from image output I/F 14.

In the second embodiment, images are obtained having corrected distortion caused by the projection lens in scanning wherein the CCD image sensor itself is moved to accomplish scanning.

The following effects are accomplished by the present invention.

Image distortion caused by mirror oscillation and image distortion caused by the projection lens are stored in memory beforehand, said distortion ratios are combined and a read image is corrected based on said combined distortion ratio, image correction is accomplished without mechanically moving the position of the oscillating mirror itself, such that the advantages of low cost and space conservation arising from simple mechanical mechanisms of image reader of the mirror oscillation type are not lost. Since correction is accomplished by combining distortion caused by the projection lens and distortion caused by mirror oscillation, it is possible to correct distortion caused by the projection lens.

Since different image distortion ratios at each magnification value of distortion caused by the projection lens are stored in memory beforehand and the read image is corrected based on said stored distortion ratios, it is possible to correct distortion of a read image regardless of changes in magnification value.

Furthermore, the image distortion ratio due to the projection lens is combined with the distortion ratio caused by mirror oscillation and stored in memory beforehand to correct a read image based on said stored distortion ratios, such that it is possible to correct distortion caused by the projection lens.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. A projected image reading apparatus comprising:
    a projector which projects an image;
    a scanning mirror which deflects the projected image by mirror oscillation method;
    reading means for reading the projected image deflected by said scanning mirror and outputting an image data corresponding to the projected image;
    memory means for storing distortion data which is concerned with a distortion due to the mirror oscillation method; and
    correcting means for correcting the distortion of the image data in accordance with the distortion data.

2. A projected image reading apparatus according to claim 1, wherein said scanning mirror rotates from a start position to an end position, when said scanning mirror is located at the start position, a top edge of the projected image is read, when said scanning mirror is located at the end position, a bottom edge of the projected image is read.

3. A projected image reading apparatus according to claim 2, wherein said reading means is a line sensor which is provided at a fixed position.

4. A projected image reading apparatus according to claim 1, wherein said correcting means corrects the distortion of the image data by electrically changing magnification.

5. A projected image reading apparatus comprising:
    a projection lens mount for mounting one of projection lens among a plurality of projection lenses mountable on the projection lens mount;
    reading means for reading an image projected through the projection lens mounted on said projection lens mount by its relative movement to the projected image and outputting an image data corresponding to the projected image;

memory means for storing respective distortion data of said plurality of projection lenses;

discriminating means for discriminating which projection lens is mounted on said projection lens mount among said plurality of lenses; and correcting means for correcting distortion of the image data based on the distortion data of the projection lens which is discriminated to be mounted on the projection lens mount.

6. A projected image reading apparatus according to claim 5, wherein said correcting means corrects the distortion of the image data by electrically changing magnification.

7. A projected image reading apparatus according to claim 5, wherein said projection lenses have respective magnetic information, said discriminating means discriminates which projection lens is mounted on said projection lens mount based on the magnetic information.

8. A projected image reading apparatus comprising:

a projector which projects an image, having a zoom projection lens variable magnification;

reading means for reading an image projected through the zooming projection lens by its relative movement to the projected image and outputting an image data corresponding to the projected image;

memory means for storing respective distortion data concerned with magnification of said plurality of zooming projection lens;

discriminating means for discriminating a current magnification of the zooming projection lens;

correcting means for correcting distortion of the image data based on the distortion data corresponding to magnification of the zooming projection lens which is discriminated by said discriminating means.

9. A projected image reading apparatus according to claim 8, wherein said correcting means corrects the distortion of the image data by electrically changing magnification.

10. A projected image reading apparatus comprising:

a projector which projects an image;

a scanning mirror which deflects the projected image by mirror oscillation method;

reading means for reading the projected image deflected by said scanning mirror and outputting an image data corresponding to the projected image;

discriminating means for discriminating which projection lens is mounted on said projection lens mount among said plurality of lenses;

memory means for storing respective distortion data of said plurality of projection lenses and distortion data concerned with a distortion being due to the oscillation method;

correcting means for correcting distortion of the distortion data of the projection lens which is discriminated to be mounted on the projection lens mount and the distortion data concerned with a distortion being due to the oscillation method.

11. A projected image reading apparatus according to claim 10, wherein said scanning mirror rotates from a start position to an end position, when said scanning mirror is located at the start position, a top edge of the projected image is read, when said scanning mirror is located at the end position, a bottom edge of the projected image is read.

12. A projected image reading apparatus according to claim 11, wherein said reading means is a line sensor which is provided at a fixed position.

13. A projected image reading apparatus according to claim 10, wherein said correcting means corrects the distortion of the image data by electrically changing magnification.

14. A projected image reading apparatus according to claim 10, wherein said projection lenses have respective magnetic information, said discriminating means discriminates which projection lens is mounted on said projection lens mount based on the magnetic information.

15. A projected image reading apparatus comprising:

a projector which projects an image, having a zoom projection lens variable magnification;

a scanning mirror which deflects the projected image by mirror oscillation method;

reading means for reading the projected image deflected by said scanning mirror and outputting an image data corresponding to the projected image;

discriminating means for discriminating a current magnification of the zooming projection lens;

memory means for storing respective distortion data concerned with magnification of said plurality of zooming projection lens and distortion data concerned with a distortion being due to the oscillation method;

correcting means for correcting distortion of the image data based on the distortion data corresponding to magnification of the zooming projection lens which is discriminated by said discriminating means and the distortion data concerned with a distortion being due to the oscillation method.

16. A projected image reading apparatus according to claim 15, wherein said scanning mirror rotates from a start position to an end position, when said scanning mirror is located at the start position, a top edge of the projected image is read, when said scanning mirror is located at the end position, a bottom edge of the projected image is read.

17. A projected image reading apparatus according to claim 16, wherein said reading means is a line sensor which is provided at a fixed position.

18. A projected image reading apparatus according to claim 15, wherein said correcting means corrects the distortion of the image data by electrically changing magnification.

* * * * *